(12) United States Patent
Klein

(10) Patent No.: US 9,372,529 B1
(45) Date of Patent: Jun. 21, 2016

(54) STORAGE DEVICE SELECTIVELY UTILIZING POWER FROM A HOST AND POWER FROM AN AC ADAPTER

(71) Applicant: Western Digital Technologies, Inc., Irvine, CA (US)

(72) Inventor: Barry L. Klein, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 275 days.

(21) Appl. No.: 13/923,301

(22) Filed: Jun. 20, 2013

Related U.S. Application Data

(60) Provisional application No. 61/829,041, filed on May 30, 2013.

(51) Int. Cl.
   *G06F 1/32* (2006.01)
(52) U.S. Cl.
   CPC ............ *G06F 1/3287* (2013.01); *G06F 1/3203* (2013.01)
(58) Field of Classification Search
   CPC .................................. G06F 1/32; G06F 1/3287
   USPC .......................................................... 713/323
   See application file for complete search history.

(56) References Cited

U.S. PATENT DOCUMENTS

| | | | | |
|---|---|---|---|---|
| 5,724,592 A * | 3/1998 | Garner | ................... | G06F 1/3225 711/103 |
| 8,166,317 B2 | 4/2012 | Ito et al. | | |
| 8,996,892 B1 * | 3/2015 | Chu | ........................ | G06F 1/325 710/62 |
| 9,047,086 B1 * | 6/2015 | Liu | ........................ | G06F 1/325 |
| 2005/0120251 A1 * | 6/2005 | Fukumori | ................. | G06F 1/30 713/300 |
| 2005/0144491 A1 | 6/2005 | Zayas | | |
| 2005/0240784 A1 * | 10/2005 | Sugasawa | ...................... | 713/300 |
| 2005/0251696 A1 * | 11/2005 | Cumpson | .............. | G06F 1/3203 713/300 |
| 2005/0267999 A1 * | 12/2005 | Suematsu | ............... | G06F 1/266 710/14 |
| 2006/0129703 A1 * | 6/2006 | Oshikawa | ............. | G06F 1/3221 710/14 |
| 2008/0002509 A1 * | 1/2008 | You | .......................... | G06F 1/26 365/230.05 |
| 2008/0288801 A1 * | 11/2008 | Takahashi | ...................... | 713/324 |
| 2009/0019301 A1 * | 1/2009 | Minami | ........................ | 713/324 |

(Continued)

OTHER PUBLICATIONS

"Commission Regulation (EC) No. 1275/2008 of Dec. 17, 2008 implementing Directive 2005/32/EC of the European Parliament and of the Council with regard to ecodesign requirements for standby and off-mode electric power consumption of electrical and electronic household and office equipment", http://ec.europa.eu/energy/efficiency/ecodesign/doc/legislation/guidelines_for_smes_1275_2008_okt_09.pdf, also found in Office Journal of the European Union, , Dec. 18, 2008, pp. 1-8.

(Continued)

*Primary Examiner* — Thomas Lee
*Assistant Examiner* — Volvick Derose

(57) ABSTRACT

A storage device including a first switch unit configured to allow power to be received by the storage device from an AC adapter, and to prevent power from being received by the storage device from the AC adapter, and a storage controller. The storage controller can be configured to place the storage device in a first operating mode or a second operating mode, wherein the second operating mode is a reduced power state relative to the first operating mode, and control the first switch unit to allow power to be received by the storage device from the AC adapter when the storage device is in the first operating mode, and to prevent power from being received by the storage device from the AC adapter when the storage device is in the second operating mode.

15 Claims, 6 Drawing Sheets

(56) References Cited

U.S. PATENT DOCUMENTS

| | | | | |
|---|---|---|---|---|
| 2009/0259866 | A1* | 10/2009 | Ito | G06F 1/266 713/323 |
| 2013/0124879 | A1* | 5/2013 | Zhang et al. | 713/300 |
| 2013/0198544 | A1* | 8/2013 | Ju | G06F 1/325 713/323 |

OTHER PUBLICATIONS

Draft 2012, "Commission Regulations (EU) No . . . / . . . of XXX amending Commission Regulation (EC) No. 1275/2008 with regard to ecodesign requirements for standby, off mode electric power consumption of electrical and electronic household and office equipment and amending Commission Regulation (EC) No. 642/2009 with regard to ecodesign requirements for televisions", http://www.eceee.org/ecodesign/products/Lot26_networked_standby_losses/EU86_EN_1_1.pdf, downloaded from the internet Jan. 16, 2014, pp. 1-16.

Draft 2012, "Explanatory Memorandum to Commission Regulations (EU) No . . . / . . . of XXX amending Commission Regulation (EC) No. 1275/2008 with regard to ecodesign requirements for standby, off mode electric power consumption of electrical and electronic household and office equipment and amending Commission Regulation (EC) No. 642/2009 with regard to ecodesign requirements for televisions", http://www.ebpg.bam.de/de/ebpg_medien/tren26/026_workd_13-02_notes.pdf, downloaded from the internet Jan. 16, 2014, pp. 1-16.

* cited by examiner

STORAGE DEVICE SELECTIVELY UTILIZING POWER FROM A HOST AND POWER FROM AN AC ADAPTER

CROSS-REFERENCE TO RELATED APPLICATIONS

This application claims the benefit of U.S. Provisional Application No. 61/829,041, filed on May 30, 2013, entitled "STORAGE DEVICE SELECTIVELY UTILIZING POWER FROM A HOST AND POWER FROM AN AC ADAPTER," which is hereby incorporated by reference in its entirety.

BACKGROUND

Conventionally, a storage device may draw power from a host and an AC adapter. However, in certain situations, it may be undesirable for the storage device to draw power from the host or the AC adapter. For example, in certain situations it may be inefficient for the storage device to draw power from the host, and in certain situations it may be inefficient for the storage device to draw power from the AC adapter. Thus, the storage device may be inefficiently drawing power from the host or the AC adapter.

BRIEF DESCRIPTION OF THE DRAWINGS

The features and advantages of the present embodiments will become more apparent from the detailed description set forth below when taken in conjunction with the drawings, wherein.

DETAILED DESCRIPTION

Figure 1:
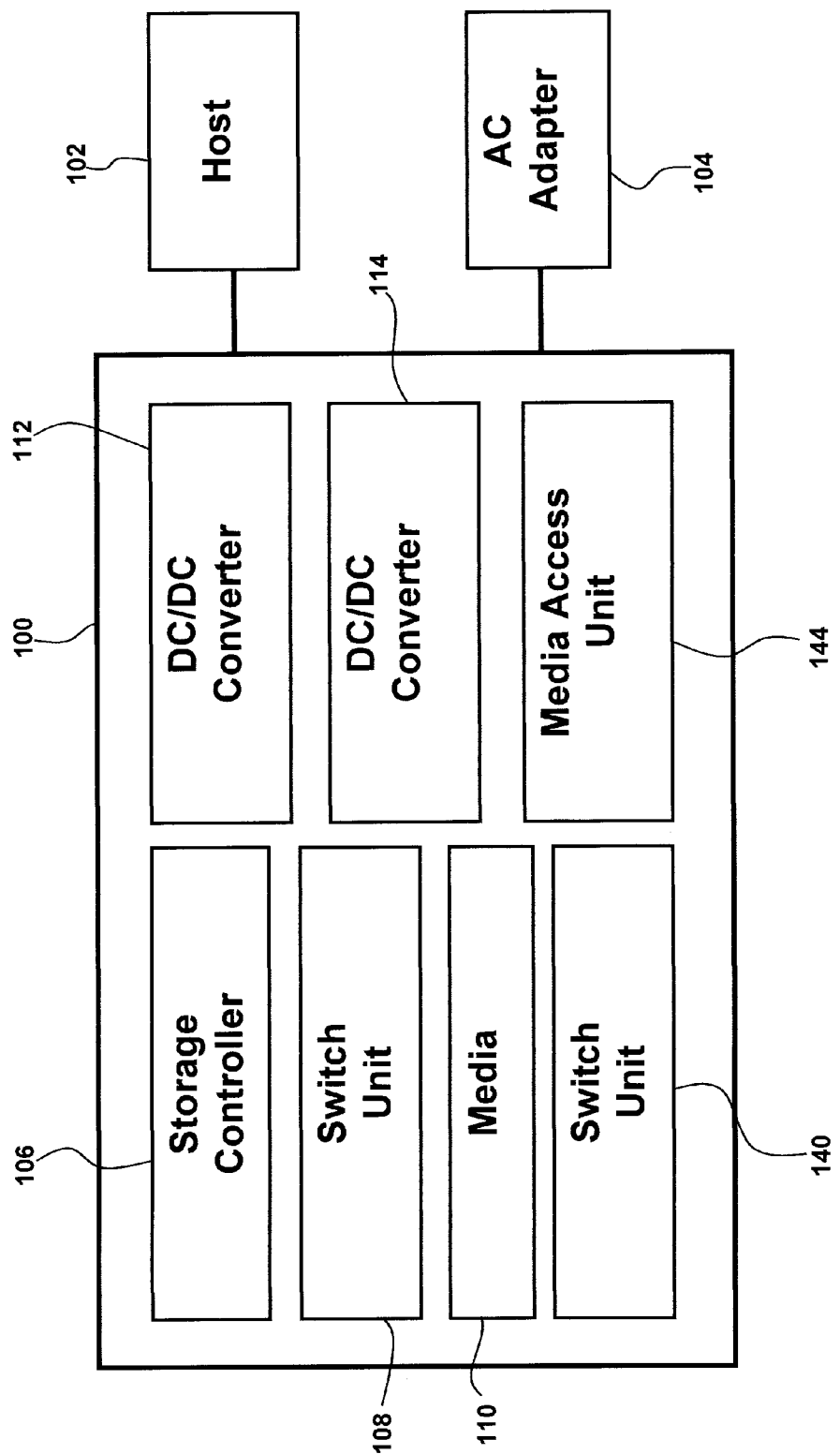
FIG. 1 is a block diagram of a storage device configured to be connected to a host and an AC adapter according to an embodiment.

In an embodiment shown in FIG. 1, a storage device 100 is configured to be connected to a host 102, an AC adapter 104, or any combination thereof. The storage device 100 can comprise, for example, a direct attached storage ("DAS") device.

In an embodiment, the storage device is configured to be connected to the host 102 using a universal serial bus ("USB") interface, a Firewire interface, a Thunderbolt interface, or other appropriate interface which allows the storage device to receive both data and power from the host. In an embodiment, the USB interface comprises a USB 2.0 interface or a USB 3.0 interface.

The host 102 can be, for example, a personal computer ("PC") host, an Apple host, a Unix host, a Linux host, or other types of hosts. Furthermore, in an embodiment, the host 102 comprises a desktop computer, a laptop, a tablet, or other electronic device which may need to store or access data in the storage device 100.

In an embodiment, the AC adapter 104 is configured to receive AC power from an external power source and supply DC power to the storage device 100. The AC adapter 104 can be, for example, a wall wart. In an embodiment, the storage device 100 can selectively receive power from the AC adapter 104, which will be described in more detail below.

In an embodiment shown in FIG. 1, the storage device 100 comprises a media 110, and a media access unit 144. The media 110 can comprise, for example, at least one of a magnetic recording disk or a solid state memory.

While the description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In an embodiment, the media access unit 144 comprises electrical, mechanical, or electromechanical components which may be utilized to access the media 110. For example, when the media 110 comprises the magnetic recording disk, the media access unit 144 can comprise a head stack assembly, a voice coil motor, a head gimbal assembly, a spindle motor, and/or any other electrical, mechanical, or electromechanical components which may be utilized to access the magnetic recording disk. Similarly, when the media 110 comprises the solid state memory, the media access unit 144 can comprise devices to alter states of cells in the solid state memory, and/or any other electrical, mechanical, or electromechanical components which may be utilized to access the solid state memory.

Figure 2:
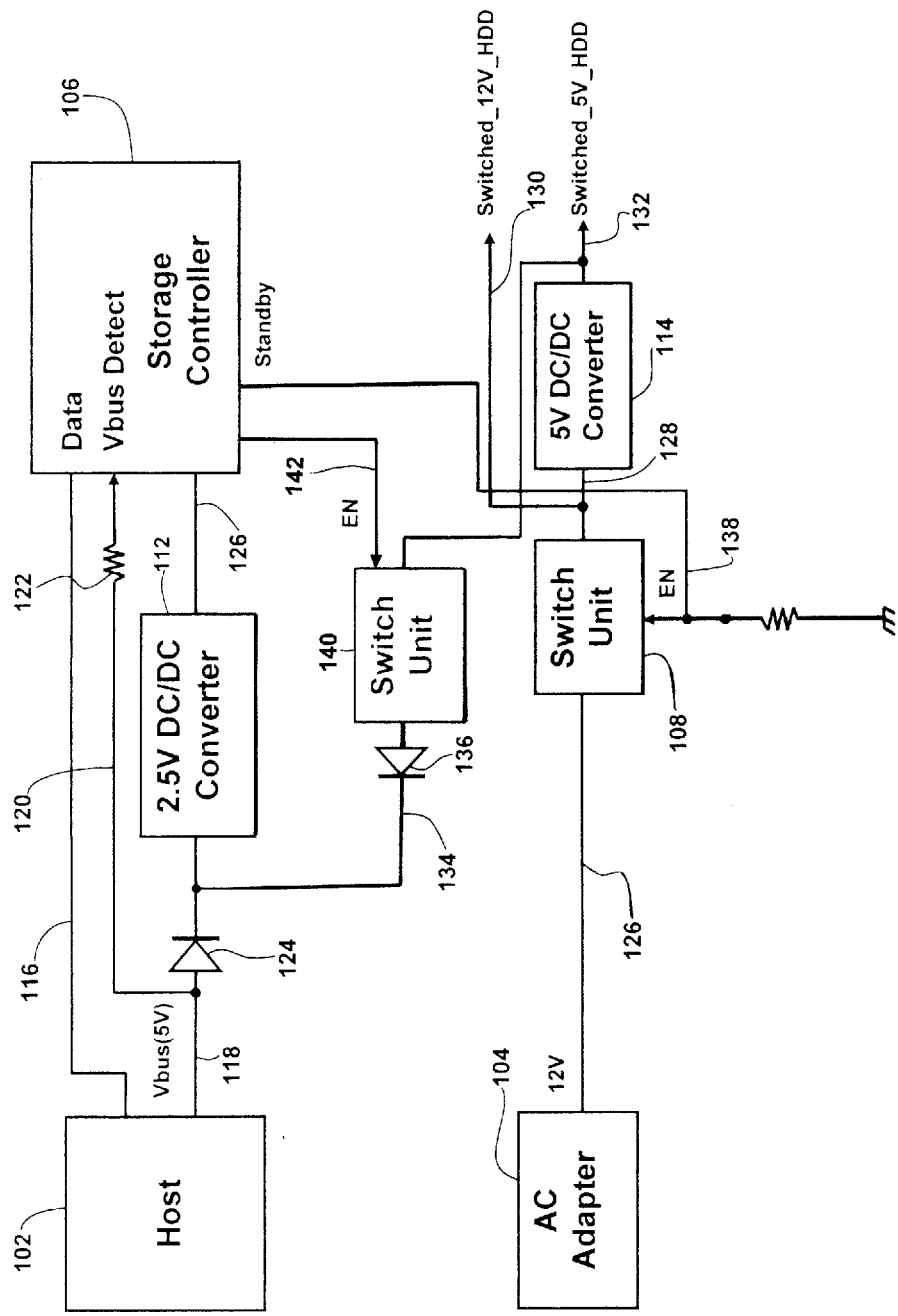
FIG. 2 is a block diagram of a storage device configured to be connected to a host and an AC adapter according to an embodiment.

In the embodiment shown in FIGS. 1 and 2, the storage device 100 also comprises a storage controller 106, a first switch unit 108, a first DC to DC converter 112, and a second DC to DC converter 114. The storage device 100 also optionally comprises a second switch unit 140.

As shown in the embodiment in FIG. 2, the storage controller 106 receives data from the host 102 at a data line 116. In an embodiment, the storage controller 106 is also configured to place the storage device 100 in a first operating mode, or a second operating mode, wherein the second operating mode is a reduced power state relative to the first operating mode. Utilizing the data line 116, the host 102 can indicate to the storage controller 106 that the storage controller 106 should place the storage device 100 in the first operating mode, or the second operating mode. In an embodiment, the second operating mode comprises a standby mode or an off mode.

In an embodiment, the host 102 can also indicate to the storage controller 106 utilizing the data line 116 that the host 102 will be operating in the first operating mode or the second operating mode. In an embodiment, the first operating mode of the host 102 and the first operating mode of the storage device 100 need not be the exact same operating modes or perform the exact same operations. Similarly, in an embodiment, the second operating mode of the host 102 and the second operating mode of the storage device 100 need not be the exact same operating modes or perform the exact same operations.

In an embodiment, the storage controller 106 can place the storage device in the first operating mode or the second operating mode based on instructions received from the host 102, other data received from the host 102, or when a predetermined time period has expired without receiving data from the host 102.

In an embodiment, during the standby mode or the off mode, the storage device 100 may be spun-down when the storage device 100 comprises the magnetic recording disk (e.g., a hard disk drive, hybrid drive or other mechanical drive). When spun down, most or all of the mechanical components of a mechanical drive are generally not moving, which can significantly reduce the power usage of the mechanical drive.

In an embodiment, the storage controller 106 receives power from the host 102 at a power line 118. In an embodiment, the storage controller 106 detects whether or not the host 102 is supplying power to the storage controller 106 using a power line 120 and a resistor 122. In an embodiment, the host 102 is configured to supply DC power at the power line 118. As seen in the embodiment shown in FIG. 2, the power line 118 is fed into an input of the first DC to DC converter 112. In an embodiment, the first DC to DC converter 112 converts power from the host 102 from a first voltage to a second voltage different than the first voltage. An output of the first DC to DC converter 112 is connected to a power line 126 and supplied to the storage controller 106. Thus, the storage controller 106 receives power from the host 102 at the second voltage instead of the first voltage.

For example, in the embodiment shown in FIG. 2, the host 102 supplies 5V of power, while the first DC to DC converter 112 comprises a 2.5 DC to DC converter. Thus, the first DC to DC converter 112 converts the 5V of power to 2.5V of power and the storage controller 106 receives 2.5V of power. However, the host 102 may supply power at other voltages aside from 5V and the first DC to DC converter 112 may convert the power supplied by the host 102 to other voltages aside from 2.5V.

Furthermore, in an embodiment, a first diode 124 is located between the first DC to DC converter 112 and the host 102. In an embodiment, the first diode 124 is configured to ensure that current flows from the host 102 to the first DC to DC converter 112 and not from the first DC to DC converter 112 to the host 102.

In the embodiment shown in FIG. 2, the first switch unit 108 is configured to allow power to be received by the storage device 100 from the AC adapter 104 and to prevent power from being received by the storage device 100 from the AC adapter 104. For example, the first switch unit 108 can connect the storage device 100 to the AC adapter 104, or disconnect the storage device 100 from the AC adapter 104. In an embodiment, by placing the first switch unit 108 between the AC adapter and the storage device 100, the manufacturing cost of the first switch unit 108 can be reduced since the first switch unit 108 will disconnect DC power instead of AC power.

In an embodiment, the first switch unit 108 is configured to allow power to be received by the storage device 100 from the AC adapter 104 when the storage device 100 is in the first operating mode. In an embodiment, the first switch unit 108 is configured to prevent power from being received by the storage device 100 from the AC adapter 104 when the storage device 100 is in the second operating mode. In an embodiment, the first switch unit 108 is configured to allow power to be received by the storage device 100 from the AC adapter 104 when the host 102 is in the first operating mode. In an embodiment, the first switch unit 108 is configured to prevent power from being received by the storage device 100 from the AC adapter 104 when the host 102 is in the second operating mode.

In the embodiment shown in FIG. 2, the first switch unit 108 comprises a field-effect transistor ("FET") switch. In an embodiment, the first switch unit 108 comprises a single pole, single throw switch.

In an embodiment, the first switch unit 108 is configured to be controlled by the storage controller 106 through an ENABLE signal on an ENABLE signal line 138. For example, the storage controller 106 can assert the ENABLE signal to control the first switch unit 108 to allow power to be received by the storage device 100 from the AC adapter 104. Similarly, the storage controller 106 can de-assert the ENABLE signal to control the first switch unit 108 to prevent power from being received by the storage device 100 from the AC adapter 104. Thus, in an embodiment, the storage device 100 is configured to receive power from the host 102 when the storage device 100 is in the second operating mode, and to receive power from the AC adapter 104 when the storage device 100 is in the first operating mode.

When the first switch unit 108 allows power to be received by the storage device 100 from the AC adapter 104, the first switch unit 108 passes power from the AC adapter 104 to the storage device 100 at a power line 128 and a power line 130. The power line 130 feeds power at the voltage supplied by the AC adapter 104 to the storage device 100. In an embodiment, the power line 130 can be electrically connected to one or more components of the storage device 100 such as the media access unit 144. In the embodiment shown in FIG. 2, the AC adapter 104 supplies 12V of power. However, the AC adapter 104 may supply power at other voltages.

In an embodiment, the power line 128 is connected to an input of the second DC to DC converter 114. In an embodiment, the second DC to DC converter 114 is configured to convert power from the AC adapter 104 from a third voltage to a fourth voltage different than the first voltage. In an embodiment, the output of the second DC to DC converter 114 is connected to a power line 132, which feeds power at the third voltage to the storage device 100. In an embodiment, the power line 132 can be electrically connected to one or more components of the storage device 100 such as the media access unit 144.

For example, in the embodiment shown in FIG. 2, the second DC to DC converter 114 is a 5V DC to DC converter which converts the 12V of power from the AC adapter 104 into 5V of power. Thus, as shown in the embodiment in FIG. 2, the storage device 100 can be configured to receive 12V of power from the power line 130 and/or 5V of power from the power line 132.

In the embodiment shown in FIG. 2, an output of the second DC to DC converter 114 is optionally connected to an input of the first DC to DC converter 112. In an embodiment, this can reduce amount of power provided by the host 102 when the first switch unit 108 allows the storage device 100 to receive power from the AC adapter 104. For example, if a voltage of the power provided by the second DC to DC converter 114 is higher than a voltage of the power provided by the host 102, then the first DC to DC converter 112 may draw power primarily from the second DC to DC converter 114. Where the voltage of the power provided by the second DC to DC converter 114 is similar to the voltage of the power provided by the host 102, then the first DC to DC converter 112 may draw power from both the second DC to DC converter 114 and the host 102. In addition, even when the voltage of the power provided by the second DC to DC converter 114 is less than the voltage of the power provided by the host 102, the first DC to DC converter 112 may still draw some power from the second DC to DC converter 114. Thus, the amount of power provided by the host 102 may be reduced.

In an embodiment, a second diode 136 is located between the second DC to DC converter 114 and the first DC to DC converter 112. In an embodiment, the second diode 136 can ensure that power flows from the second DC to DC converter 114 to the first DC to DC converter 112 instead of from the first DC to DC converter 112 to the second DC to DC converter 114. In an embodiment, the storage device 100 receives a first amount of power from the host 102 when the storage device 100 is in the second operating mode, and a second amount of power from the host 102 when the storage device 100 is in the first operating mode, wherein the second amount of power is less than the first amount of power.

In an embodiment, the second switch unit 140 can be used in addition or instead of the second diode 136. For example, an output of the second switch unit 140 is connected to a power line 134, which is connected to the power line 118. Thus, the second switch unit 140 is configured to connect the output of the second DC to DC converter 114 to the input of the first DC to DC converter 112. In an embodiment, the second switch unit 140 comprises a FET switch. In an embodiment, the second switch unit 140 comprises a single pole, single throw switch.

In an embodiment, the storage controller 106 is configured to control the second switch unit 140 to connect the output of the second DC to DC converter 114 to the input of the first DC to DC converter 112 when the first switch unit 108 allows power to be received by the storage device 100 from the AC adapter 104. In an embodiment, the storage controller 106 is configured to control the second switch unit 140 to disconnect the output of the second DC to DC converter 114 from the input of the first DC to DC converter 112 when the first switch unit 108 prevents power from being received by the storage device 100 from the AC adapter 104. In an embodiment, the storage controller 106 controls the operation of the second switch unit 140 using an ENABLE signal on an ENABLE signal line 142 similar to the ENABLE signal on the ENABLE signal line 138 for the first switch unit 108.

In an embodiment this can reduce an amount of power consumed by the host 102. Furthermore, in an embodiment, this can reduce an overall amount of power consumed by the storage device 100 since the storage device 100 may consume a large amount of power when the storage device 100 is in the first operating mode, and the AC adapter 104 may be more efficient than the host 102 at supplying large amounts of power.

Figure 3:
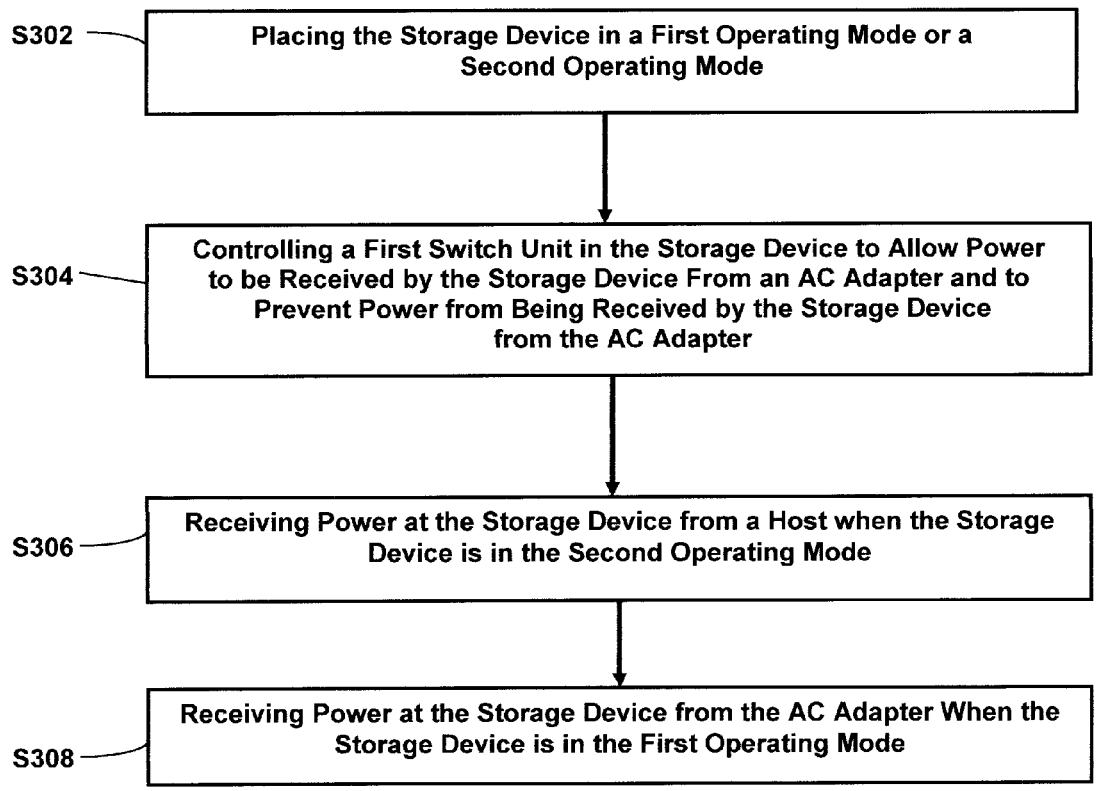
FIG. 3 depicts a process for powering a storage device according to an embodiment.

A process for powering a storage device is shown in an embodiment in FIG. 3. In block S302, the storage controller 106 places the storage device 100 in a first operating mode or a second operating mode, wherein the second operating mode is a reduced power state relative to the first operating mode. In block S304, the controller 106 controls the first switch unit 108 to allow power to be received by the storage device 100 from the AC adapter 104 when the storage device 100 is in the first operating mode, and to prevent power from being received by the storage device 100 from the AC adapter 104 when the storage device 100 is in the second operating mode.

In block S306, power is received at the storage device 100 from the host 102 when the storage device 100 is in the second operating mode. For example, the storage controller 106 can receive power from the host 102 when the storage device 100 is in the second operating mode. In block S308, power is received at the storage device 100 from the AC adapter 104 when the storage device 100 is in the first operating mode.

Figure 4:
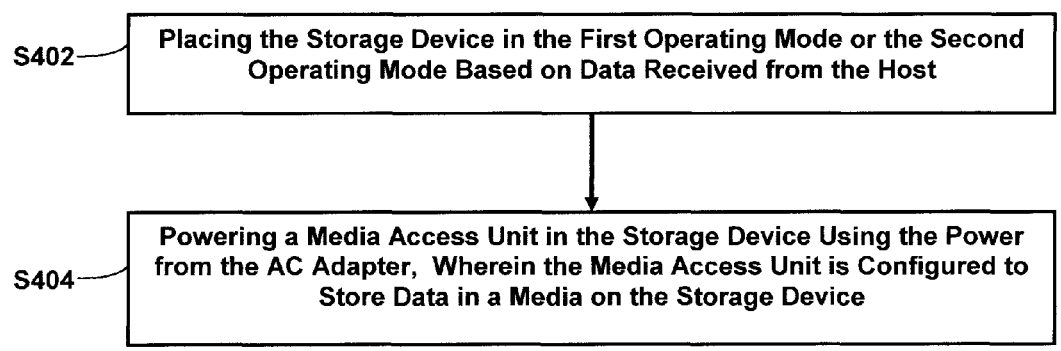
FIG. 4 depicts additional or optional blocks for a process for powering a storage device according to an embodiment.

Additional or optional blocks for a process for powering a storage device are shown in an embodiment in FIG. 4. In block S402, the storage controller 106 places the storage device 100 in the first operating mode or the second operating mode based on data received from the host 102. In block S404, the media access unit 144 is powered using the power from the AC adapter 104.

Figure 5:
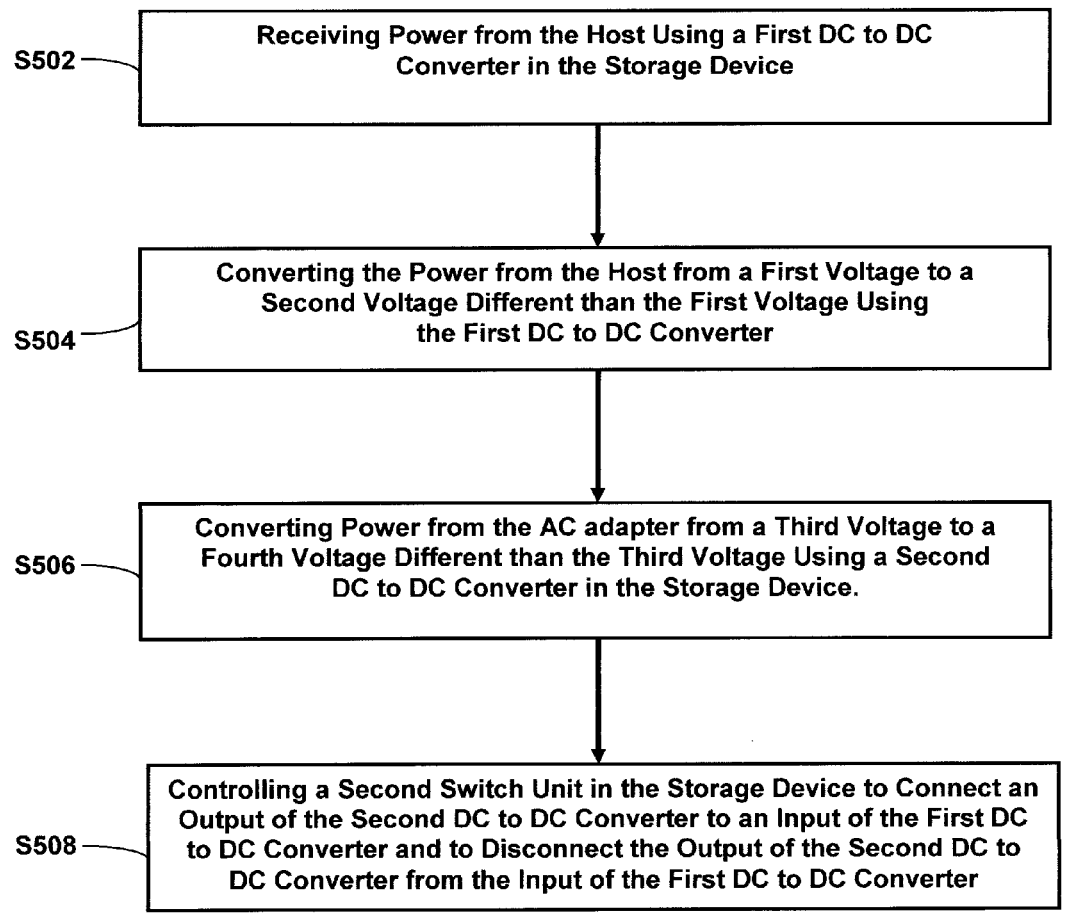
FIG. 5 depicts additional or optional blocks for a process for powering a storage device according to an embodiment.

Additional or optional blocks for a process for powering a storage device are shown in an embodiment in FIG. 5. In block S502, the storage device 100 receives power from the host 102 using the first DC to DC converter 112. In block S504, the first DC to DC converter 112 converts the power from the host 102 from the first voltage to the second voltage different than the first voltage. For example, the first DC to DC converter 112 can convert the 5V of power from the host 102 to 2.5V of power. In block S506, the second DC to DC converter 114 converts the power from the AC adapter 104 from the third voltage to the fourth voltage different than the third voltage. For example, the second DC to DC converter 114 can convert 12V of power from the AC adapter 104 to 5V of power.

In block S508, the storage controller 106 can control the second switch unit 140 to connect the output of the second DC to DC converter 114 to the input of the first DC to DC converter 112 when the first switch unit 108 allows power to be received by the storage device 100 from the AC adapter 104, and to disconnect the output of the second DC to DC converter 114 from the input of the first DC to DC converter 112 when the first switch unit 108 prevents power from being received by the storage device 100 from the AC adapter 104.

Figure 6:
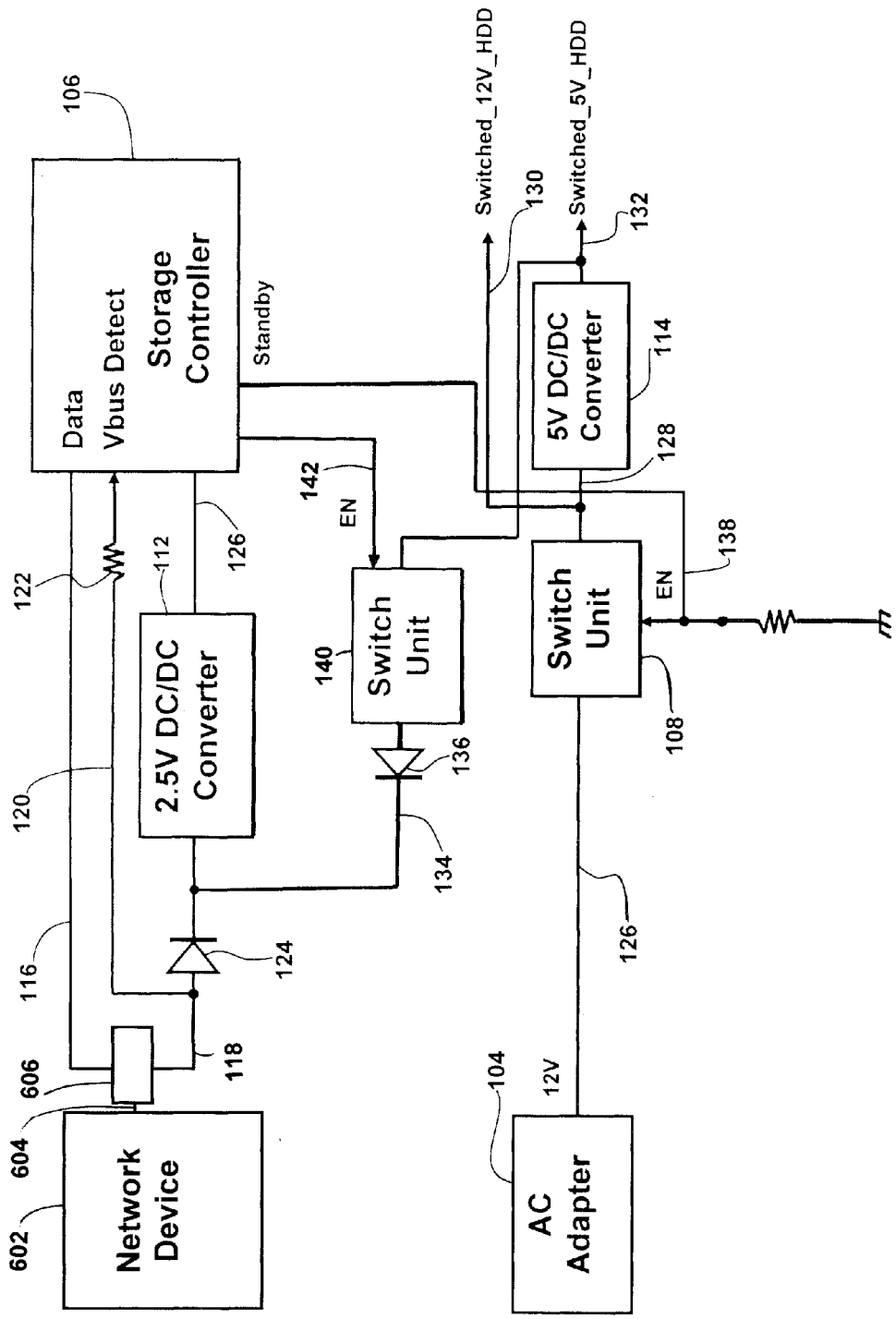
FIG. 6 is a block diagram of a storage device configured to be connected to a network device and an AC adapter according to an embodiment.

In an embodiment, the storage device 100 comprises a network attached storage ("NAS") device as shown in FIG. 6. The storage device 100 in FIG. 6 is similar to the storage device 100 in FIGS. 1 and 2 except that the storage device 100 in FIG. 6 is configured to be connected to a network device 602 instead of the host 102. In an embodiment, the network device 602 comprises a router, a switch, or other device which may allow network access to the storage device 100.

In the storage device shown in the embodiment in FIG. 6, the storage device 100 is configured to be connected to the network device 602 using a network cable 604. In an embodiment, the network cable 604 comprises an 8P8C cable or a RJ45 cable. In an embodiment, power may be provided over an Ethernet cable or other network cable, for example, using a Power over Ethernet (PoE) capable system. In some embodiments, the network device 602 also provides power to the storage device 100 over the network cable 604.

In an embodiment, the data line 116 and the power line 118 can be connected using a power conditioning block 606. The power conditioning block 606 can for example, switch data and power connection for the data line 116 and the power line 118 from the network cable 604.

In an embodiment, the storage device 100 can receive instructions from the network device 602 on the data line 116 as to whether the storage device 100 should be in the first operating mode or the second operating mode. In an embodiment, the storage controller 106 can place the storage device 100 in the first operating mode or the second operating mode based on instructions received from the network device 602, other data received from the network device 602, or when a predetermined time period has expired without receiving data from the network device 602. Notably the data from the network device 602 need not originate from the network device 602. In an embodiment, the network device 602 is connected to a network and the data could originate from other devices connected to the network.

Those of ordinary skill would appreciate that the various illustrative logical blocks, modules, and algorithm parts described in connection with the examples disclosed herein may be implemented as electronic hardware, computer software, or combinations of both. Furthermore, the embodiments can also be embodied on a non-transitory machine readable medium causing a processor or computer to perform or execute certain functions.

To clearly illustrate this interchangeability of hardware and software, various illustrative components, blocks, modules, circuits, and process parts have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The parts of a method or algorithm described in connection with the examples disclosed herein may be embodied directly in hardware, in a software module executed by a processor, or in a combination of the two. The parts of the method or algorithm may also be performed in an alternate order from those provided in the examples. A software module may reside in RAM memory, flash memory, ROM memory, EPROM memory, EEPROM memory, registers, hard disk, a removable disk, an optical disk, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the disclosure is, therefore, indicated by the appended claims rather than by the foregoing description. All changes which come within the meaning and range of equivalency of the claims are to be embraced within their scope.

What is claimed is:

1. A storage device comprising:
a first switch unit configured to selectively allow power to be received by the storage device from an AC adapter, and to prevent power from being received by the storage device from the AC adapter;
a first DC to DC converter, coupled to a host and to the first switch unit and configured to convert power from the host from a first voltage to a second voltage different than the first voltage;
a second DC to DC converter configured to convert power from the AC adapter from a third voltage to a fourth voltage different than the third voltage and to selectively couple and decouple the fourth voltage to and from the first DC to DC converter; and
a storage controller coupled to the first DC to DC converter and configured to:
receive data and a first amount of power from the host;
place the storage device in a first operating mode or a second operating mode, wherein the second operating mode is a reduced power state relative to the first operating mode; and
control the first switch unit to allow power to be received by the storage device from the AC adapter when the storage device is in the first operating mode, and to prevent power from being received by the storage device from the AC adapter when the storage device is in the second operating mode,
wherein the storage device is configured to:
receive the first amount of power from the host when the storage device is in the second operating mode, and
receive power from the AC adapter and a second amount of power from the host when the storage device is in the first operating mode, the second amount of power being less than the first amount of power, and
wherein, in the first operating mode;
when the fourth voltage is higher than a voltage of the first amount of power, the first DC to DC converter is configured to draw more power from the second DC to DC converter than from the host,
when the fourth voltage is similar to the voltage of the first amount of power, the first DC to DC converter is configured to draw power from both the second DC to DC converter and from the host, and
when the fourth voltage is less than the voltage of the first amount of power, the first DC to DC converter is configured to draw more power from the host than from the second DC to DC converter.

2. The storage device of claim 1, wherein the storage controller is further configured to place the storage device in the first operating mode or the second operating mode based on the data received from the host.

3. The storage device of claim 1, wherein an output of the second DC to DC converter is connected to an input of the first DC to DC converter.

4. The storage device of claim 1, further comprising a second switch unit configured to connect an output of the second DC to DC converter to an input of the first DC to DC converter, and to disconnect the output of the second DC to DC converter from the input of the first DC to DC converter.

5. The storage device of claim 4, wherein the storage controller is further configured to control the second switch unit to connect the output of the second DC to DC converter to the input of the first DC to DC converter when the first switch unit allows power to be received by the storage device from the AC adapter, and to disconnect the output of the second DC to DC converter from the input of the first DC to DC converter when the first switch unit prevents power from being received by the storage device from the AC adapter.

6. The storage device of claim 1, further comprising:
a media configured to store data; and
a media access unit configured to store the data on the media, wherein the media access unit is configured to be powered by the power from the AC adapter.

7. The storage device of claim 1, wherein the second operating mode comprises at least one of a standby mode or an off mode.

8. The storage device of claim 1, wherein the storage device does not receive any power from the AC adapter when the first switch unit prevents power from being received by the storage device from the AC adapter.

9. A method for powering a storage device comprising:
receiving data and a first amount of power from a host;
placing the storage device in a first operating mode or a second operating mode using a storage controller in the storage device, wherein the second operating mode is a reduced power state relative to the first operating mode;
controlling a first switch unit in the storage device to allow power to be received by the storage device from an AC adapter when the storage device is in the first operating mode, and to prevent power from being received by the storage device from the AC adapter when the storage device is in the second operating mode, using the storage controller;
providing a first DC to DC converter, coupled to the host and to the first switch unit and configured to convert power from the host from a first voltage to a second voltage different than the first voltage;
providing a second DC to DC converter configured to convert power from the AC adapter from a third voltage to a fourth voltage different than the third voltage and to selectively couple and decouple the fourth voltage to and from the first DC to DC converter;
receiving the first amount of power at the storage device from the host when the storage device is in the second operating mode; and
receiving power at the storage device from the AC adapter and a second amount of power from the host when the storage device is in the first operating mode, the second amount of power being less than the first amount of power, such that the first DC to DC converter draws:
 more power from the second DC to DC converter than from the host when the fourth voltage is higher than a voltage of the first amount of power,
 power from both the second DC to DC converter and from the host when the fourth voltage is similar to the voltage of the first amount of power, and
 more power from the host than from the second DC to DC converter when the fourth voltage is less than the voltage of the first amount of power.

10. The method of claim 9, further comprising placing the storage device in the first operating mode or the second operating mode based on data received from the host.

11. The method of claim 9, further comprising controlling a second switch unit in the storage device to connect an output of the second DC to DC converter to an input of the first DC to DC converter when the first switch unit allows power to be received by the storage device from the AC adapter, and to disconnect the output of the second DC to DC converter from the input of the first DC to DC converter when the first switch unit prevents power from being received by the storage device from the AC adapter, using the storage controller.

12. The method of claim 9, further comprising powering a media access unit in the storage device using the power from the AC adapter, wherein the media access unit is configured to store data in a media on the storage device.

13. The method of claim 9, wherein the second operating mode comprises at least one of a standby mode or an off mode.

14. A network attached storage device comprising:
a switch unit configured to selectively allow power to be received by the network attached storage device from an AC adapter, and to prevent power from being received by the network attached storage device from the AC adapter;
a first DC to DC converter, coupled to a network device and to the switch unit and configured to convert power from the network device from a first voltage to a second voltage different than the first voltage;
a second DC to DC converter configured to convert power from the AC adapter from a third voltage to a fourth voltage different than the third voltage and to selectively couple and decouple the fourth voltage to and from the first DC to DC converter; and
a storage controller configured to:
 receive data and a first amount of power from the network device;
 place the network attached storage device in a first operating mode or a second operating mode, wherein the second operating mode is a reduced power state relative to the first operating mode; and
 control the switch unit to allow power to be received by the network attached storage device from the AC adapter when the network attached storage device is in the first operating mode, and to prevent power from being received by the network attached storage device from the AC adapter when the network attached storage device is in the second operating mode,
wherein the network attached storage device is configured to:
 receive the first amount of power from the network device when the network attached storage device is in the second operating mode, and
 receive power from the AC adapter and a second amount of power from the network device when the network attached storage device is in the first operating mode, the second amount of power being less than the first amount of power, and
wherein, in the first operating mode;
 when the fourth voltage is higher than a voltage of the first amount of power, the first DC to DC converter is configured to draw more power from the second DC to DC converter than from the network device,
 when the fourth voltage is similar to the voltage of the first amount of power, the first DC to DC converter is configured to draw power from both the second DC to DC converter and from the network device, and
 when the fourth voltage is less than the voltage of the first amount of power, the first DC to DC converter is configured to draw more power from the network device than from the second DC to DC converter.

15. The network attached storage device of claim 14, wherein the storage controller is further configured to place the network attached storage device in the first operating mode or the second operating mode based on the data received from the network device.

* * * * *